(12) United States Patent
Van Asbrouck et al.

(10) Patent No.: US 8,975,597 B2
(45) Date of Patent: Mar. 10, 2015

(54) MULTI-LEVEL MARKERS

(75) Inventors: Johan Van Asbrouck, Phichit (TH); Arie Draaijer, Zeist (NL)

(73) Assignee: Rhino Research Europe B.V., Aalten (NL)

( * ) Notice: Subject to any disclaimer, the term of this patent is extended or adjusted under 35 U.S.C. 154(b) by 1151 days.

(21) Appl. No.: 12/992,893

(22) PCT Filed: May 14, 2009

(86) PCT No.: PCT/NL2009/050259
§ 371 (c)(1),
(2), (4) Date: Jul. 6, 2011

(87) PCT Pub. No.: WO2009/139631
PCT Pub. Date: Nov. 19, 2009

(65) Prior Publication Data
US 2011/0258924 A1 Oct. 27, 2011

Related U.S. Application Data

(60) Provisional application No. 61/127,689, filed on May 14, 2008.

(30) Foreign Application Priority Data

May 14, 2008 (EP) .................................... 08156189

(51) Int. Cl.
*G06K 19/14* (2006.01)
*G06K 19/06* (2006.01)

(52) U.S. Cl.
CPC .......... *G06K 19/06009* (2013.01); *G06K 19/14* (2013.01)
USPC .................................... 250/458.1; 250/461.1

(58) Field of Classification Search
CPC .......... G01N 21/6408; G01N 21/6428; G01N 21/6456; G01N 21/6458
USPC .......................................... 250/458.1, 461.1
See application file for complete search history.

(56) References Cited

U.S. PATENT DOCUMENTS

| 4,272,417 A | 6/1981 | Barke et al. |
| 4,368,591 A | 1/1983 | Barke et al. |
| 4,853,429 A | 8/1989 | Sannan et al. |
| 4,881,343 A | 11/1989 | Sannan et al. |
| 5,087,475 A | 2/1992 | Bazin et al. |
| 5,424,006 A | 6/1995 | Murayama et al. |
| 5,470,581 A | 11/1995 | Grillo et al. |
| 5,569,317 A | 10/1996 | Sarada et al. |
| 5,611,958 A | 3/1997 | Takeuchi et al. |
| 5,746,022 A | 5/1998 | Brown et al. |
| 5,766,324 A | 6/1998 | Ikegaya et al. |
| 5,849,320 A | 12/1998 | Turnblad et al. |
| 6,353,479 B1 * | 3/2002 | Lubawy et al. ............. 358/1.13 |
| 6,897,999 B1 | 5/2005 | Bass et al. |
| 7,184,203 B2 | 2/2007 | Burgener et al. |
| 7,727,775 B2 * | 6/2010 | Willson et al. ................ 436/518 |
| 2003/0027138 A1 * | 2/2003 | Jamir et al. ....................... 435/6 |
| 2003/0235836 A1 * | 12/2003 | Simonetta et al. ................. 435/6 |
| 2004/0121257 A1 * | 6/2004 | Kaminsky et al. ............ 430/201 |
| 2004/0169847 A1 * | 9/2004 | Dukler ............................ 356/71 |
| 2005/0235848 A1 | 10/2005 | Butland |
| 2006/0014045 A1 * | 1/2006 | Einhorn et al. ............... 428/690 |
| 2010/0108961 A1 * | 5/2010 | Guillou et al. ................ 252/601 |

FOREIGN PATENT DOCUMENTS

| FR | 0619062 A1 * | 3/1994 |
| WO | WO-99/66784 | 12/1999 |
| WO | WO-00/62238 | 10/2000 |
| WO | WO-01/28781 | 4/2001 |
| WO | WO-02/20695 | 3/2002 |
| WO | WO-02/086052 | 10/2002 |

OTHER PUBLICATIONS

International Search Report for PCT/NL2009/050259, mailed on Jul. 8, 2009, 2 pages.

* cited by examiner

*Primary Examiner* — Casey Bryant
(74) *Attorney, Agent, or Firm* — Morrison & Foerster LLP

(57) ABSTRACT

The present invention is in the field of product marking and identification, more in particular to methods of differentiating products or product versions and to methods of product authentication. The present invention further relates to marker systems for product authentication, to a kit of parts for applying a marker system to a product and identifying the marked product, in particular seed, to seed coating compositions and to coated seed.

32 Claims, No Drawings

MULTI-LEVEL MARKERS

CROSS-REFERENCE TO RELATED APPLICATIONS

This application is the national phase of PCT application PCT/NL2009/050259 having an international filing date of 14 May 2009, which claims benefit of European application No. 08156189.6, filed 14 May 2008, and which claims priority under 35 U.S.C. §119(e) to U.S. provisional application Nos. 61/127,689, filed 14 May 2008. The contents of the above patent applications are incorporated by reference herein in their entirety.

FIELD OF THE INVENTION

The present invention is in the field of product marking and identification, more in particular to methods of differentiating products or product versions and to methods of product authentication. The present invention further relates to marker systems for product authentication, to a kit of parts for applying a marker system to a product and identifying the marked product, in particular seed, to seed coating compositions and to coated seed.

BACKGROUND OF THE INVENTION

Product marking is all about the ability to quickly and easily identify a product, its constituents and other characteristics. Punches, stamps and dies are conventional tools for marking products. The characteristic imprint on the product facilitates the identification of the product and hence can prevent misidentification and fraud. However, not all products are amenable to physical imprinting. Delicate products may for instance be harmed by the process. Chemical markings can be used in such instances and colour dyes such as ink may for instance be used to provide a full or partial coating. However, such product marking methods can easily be counterfeited. For some applications, the marker is preferably invisible, but readily detectable by a legitimate control. More sophisticated product marking methods include 2D data matrix prints that can store a lot more information about the product than a 1d code such as barcode. In addition to prints, radiowave-detectable markers of light detectable markers may be used for product marking.

In one type of anti-counterfeit a measure, an ultraviolet (UV) ink may be used to mark the product with an identifying indicia. One benefit of using the UV ink is that it is typically not visible when illuminated with light in the visible spectrum (380-770 nm), but is visible when illuminated with light in the UV spectrum (200-380 nm). Therefore, counterfeiters will be unable to tell whether the product contains a security mark by merely looking at the product when the product is illuminated with visible light.

A number of UV inks are readily available in the security industry and can be obtained at a relatively low cost. Several UV ink types and compositions are described, for example, in U.S. Pat. No. 5,569,317.

However, the use of security marks containing a UV ink has seen increased use and counterfeiters have become knowledgeable about their use. It has been a common practice for counterfeiters to examine the UV ink from a product sample, reproduce or procure the same or similar UV ink that matches the characteristics of the UV ink from the product sample, and apply the same security mark on the counterfeit products using the substitute UV ink.

In another type of anti-counterfeit and anti-diversion measure, an infrared (IR) ink is used to mark the product with an identifying indicia. As with the UV ink, one benefit of using the IR ink is that it is typically not visible when illuminated with light in the visible spectrum, but is visible when illuminated with light in the IR spectrum (800-1600 nm). An additional benefit of using the IR ink is that it is more difficult to reproduce or procure the matching IR ink by studying a product sample containing the IR security mark. Examples of IR security mark usage are given in U.S. Pat. No. 5,611,958 and U.S. Pat. No. 5,766,324.

An object of this invention is to provide a product authentication system and method employing a unique mark that is simple and cost-effective to apply and read, but provides several layers of protection against counterfeiters and includes anti-counterfeit and anti-diversion features.

In alternative embodiments, it is an aim of the present invention to provide proof of origin of seeds or preservation of the identity of the seed.

In still further alternative embodiments, it is an aim of the present invention to provide a method to determine seed quality and-or the quality of a seed treatment process.

SUMMARY OF THE INVENTION

The present inventors have now found that the combined use of an upconversion (UC) marker and at least a second marker, which may be an ultraviolet/visible (UV/VIS) marker and/or a near infrared (NIR) marker, and/or a phosphorescent (Phos) marker, preferably an ultraviolet/visible (UV/VIS) marker and/or a near infrared (NIR) marker and even more preferably a near infrared (NIR) marker, may provide for a dual or multi-colour that can serve as a unique code that, when applied to a product and detected by appropriate equipment, can be used to identify that product. It is an advantage of the use of the UC and UV/VIS/NIR or UC and UV/VIS/NIR/Phos markers that neither can be detected when irradiated by light of the visible spectrum. Hence the marking of the product cannot be detected unless scanned for by using dedicated detection equipment. It is another advantage of the present marker system that the dual or multi colour UC/UV-VIS-NIR OR UC/UV-VIS-NIR-PHOS or UC/UV-VIS-NIR OR UC/UV-VIS-NIR-PHOS-Phos system can be combined with a large number of specific UV fluorescence markers, each of which are also invisible to the human eye when irradiated by light of the visible spectrum. Hence, the number of possible combinations of fluorescence markers, especially when the individual markers are also applied at specific intensities to the product, is virtually limitless. This means that many different products can each be provided with a unique authentication code, composed of a dual or multi colour UC/UV-VIS-NIR OR UC/UV-VIS-NIR-PHOS code, optionally in combination with one or more UV fluorescence codes. In addition, the combination of the UC marker with the UV-VIS-NIR-Phos system allows for the presence of phosphorescent markers which can only be detected at very low levels when excitation irradiation is interrupted and phosphorescence resulting from said excitation is measured in the absence of excitation irradiation. Thus, the Phos system of the present invention allows for the presence of phosphorescent markers which can only be detected when excitation irradiation is interrupted and phosphorescence resulting from said excitation is measured in the absence of excitation irradiation. It is possible to use such low marker concentrations that specific emission levels are lower than autofluorescence and/or background radiation emitted by the object marked with the phosphorescent marker. This makes it virtually impossible to detect the marker, unless it is known that the marker is there and the observer knows what to look for. When used in combination with many other UC/UV/VIS/NIR markers, each with there own excitation emission spectra and requiring pre-knowledge of the "code", the use of the system of the present invention provides for an additional code key that increases the number of possible codes significantly. Hence, it is preferred that very low levels of the phosphorescent markers are used (such as below 1 ppm, for instance 0.001-0.99 ppm), because such low levels cannot be detected under continuous excitation irradiation due to high background irradiation levels. This provides for a secret or difficult-to-detect marker system. In alternative embodiments, levels of the phosphorescent markers may suitably range from 1-1000 ppm.

In a first aspect, the present invention now provides a method for the authentication of a product, comprising providing said product with at least two markers, wherein a first of said at least two markers is an upconversion (UC) marker selected from a set of m UC markers each having a different emission spectrum, wherein m is an integer equal or greater than 3 (for instance 5), and wherein a second of said at least two markers is selected from ultraviolet (UV) markers, visible (VIS) markers, near infrared (NIR) markers, phosphorescent (Phos) markers and combinations thereof (UV-VIS-NIR-Phos markers), wherein said second marker is selected from a set of n UV-VIS-NIR-Phos markers each having a different emission spectrum, wherein n is an integer equal or greater than 5, preferably greater than 6, 7 or 8, wherein the combination of said at least two markers is provided separately or as a mixture to said product, and wherein the emission spectrum of the first marker in combination with the emission spectrum of the second marker, when each is excited with the appropriate excitation wavelength, provides for a single multi-colour marking code for said product out of a total of m×n possible multi-colour marking codes for said product, thereby uniquely marking said product.

In a preferred embodiment, said second marker of said at least two markers is a near infrared (NIR) marker.

In another preferred embodiment of said method, the method further comprises providing said product with at least one UV-VIS marker, wherein the emission wavelength at which the UV-VIS marker is detected is different from the emission wavelength at which the UC and/or NIR markers are detected.

In another preferred embodiment of said method, the at least one UV-VIS marker comprises at least three UV fluorescent compounds each emitting light at a different wavelength. These additional markers are preferably provided as part of a sub-coding system comprising at least one UV fluorescent marker. Most preferably, said sub-coding system comprises at least three LTV fluorescent compounds each emitting light at a different wavelength, such as for instance four, five, six or more different LTV fluorescence markers.

In another preferred embodiment of said method, at least one marker of said at least two markers is provided separately to said product as part of a product-treatment process, and wherein the intensity of said at last one marker is used to monitor the product-treatment process.

In preferred embodiments of aspects of the present invention, the product is a seed or seed coating.

In other preferred embodiments of aspects of the present invention, the upconversion (UC) marker is selected from the group consisting of the markers 50020, F0027, Y0037, A0007, Z0011, and K0080 available from BrandWatch™ Global Technologies, Seattle, Wash., USA, and the markers PTIR475, PTIR545, PTIR550, and PTIR660, available from Phosphor Technology Ltd, Stevenage, Herts, U.K.

In yet other preferred embodiments of aspects of the present invention, the near infrared (NIR) marker is selected from the group consisting of FHI 8162, FHI 7782, FHI 8082, FHI 8022, and FHI 7832, available from Fabricolor Holding Inc., Paterson, N.J., USA, and the invisible inks marketed under the name ClirCode available from Eastman Chemical Company, Kingsport, Tenn., USA and the IR dye 700 and 800 labels available from LI-COR Biosciences, Lincoln, Neb., USA.

In yet other preferred embodiments of aspects of the present invention, the ultraviolet (UV) marker is selected from the group consisting of fluoresceins, rhodamines (FAM, R6G, TAMRA, and ROX), Texas red, BODIPY, coumarins, cyanine dyes (thiazole orange [TO], oxazole yellow [YO], TOTO, YOYO; Cy3, Cy5), and Alexa dyes.

In yet other preferred embodiments of aspects of the present invention, the visible (VIS) marker is selected from the group consisting of regular visible dyes Examples of visible dyes include, but are not limited to, fluorescein derivatives, rhodamine derivatives, coumarins, azo dyes, metalizable dyes, anthraquinone dyes, benzodifuranone dyes, polycyclic aromatic carbonyl dyes, indigoid dyes, polymethine dyes, azacarbocyanine dyes, hemicyanine dyes, barbituates, diazahemicyanine dyes, stryrl dyes, diaryl carbonium dyes, triaryl carbonium dyes, phthalocyanine dyes, quinophthalone dyes, triphenodioxazine dyes, formazan dyes, phenothiazine dyes, such as methylene blue, azure A, azure B, and azure C, oxazine dyes, thiazine dyes, naphtholactam dyes, diazahemicyanine dyes, azopyridone dyes, azobenzene dyes, mordant dyes, acid dyes, basic dyes, metallized and premetallized dyes, xanthene dyes, direct dyes, Ieuco dyes which can be oxidized to produce dyes with hues bathochromically shifted from those of the precursor Ieuco dyes, and any other visible dyes known in the art.

In yet other preferred embodiments of aspects of the present invention, the phosphorescent (Phos) marker (also commonly referred to as "glow-in-the dark" marker) is selected from the group consisting of europium-, dysprosium-, and/or terbium-doped lutetium orthophosphate ($LuPO_4$:Eu/Dy/Tb); europium-, dysprosium-, and/or terbium-doped strontium aluminate ($SrAl2O4$: Eu/Dy/Tb); europium-, dysprosium-, and/or terbium-doped strontium magnesium silicate ($Sr_2MgSi_2O_7$:Eu/Dy/Tb), copper-activated zinc sulphide (ZnS:Cu); silver-activated zinc sulfide (ZnS:Ag); copper-activated zinc-cadmium sulphide ((Zn,Cd)S:Cu) and bismuth-activated calcium-strontium sulfide ((Ca,Sr)S:Bi).

In another aspect, the present invention provides a marker system for product authentication comprising a combination of at least two markers, wherein a first of said at least two markers is an upconversion (UC) marker selected from a set of m UC markers each having a different emission spectrum, wherein m is an integer equal or greater than 3 (for instance 5), and wherein a second of said at least two markers is selected from ultraviolet (UV) markers, visible (VIS) markers, near infrared (NIR) markers, phosphorescent (Phos) markers and combinations thereof (UV-VIS-NIR-Phos markers), wherein said second marker is selected from a set of n markers each having a different emission spectrum, wherein n is an integer equal or greater than 5, preferably greater than 6, 7 or 8, and wherein the combination of the emission spectrum of the first marker and the emission spectrum of the second marker, as produced when each marker is excited with radiation of the appropriate wavelength, provides for a single multi-colour marking code combination out of a total of m×n possible multi-colour marking code combinations, and wherein said first and second markers are provided separately or as a mixture in the form of a composition for application of said markers to a product.

In a preferred embodiment of a marker system of the invention, said second marker of said at least two markers is a near infrared (NIR) marker. Preferably the emission wavelength at which said NIR marker is detected is different from the emission wavelength at which the UC marker is detected. Preferably, said system further comprises at least one UV-VIS marker, wherein the emission wavelength at which the UV-VIS marker is detected is different from the emission wavelength at which the UC and/or NIR markers are detected.

In an alternative embodiment of a marker system of the invention, said second marker is a UV-VIS marker. Preferably the emission wavelength at which said UV-VIS marker is detected is different from the emission wavelength at which the UC marker is detected.

In preferred embodiments of a marker system of the invention, said UV-VIS marker comprises at least three UV fluorescence markers each emitting light at a different wavelength.

In a marker system of the present invention, the composition for application of said markers to a surface of a product is preferably a coating composition, most preferably a coating composition for seed. A seed coating may for instance comprise one or more polymers, dyes or pigments, emulsifiers, defoaming agents, tension active components and fungicides. Additional or alternative ingredients for a suitable coating composition are described in more detail below.

The composition seed coating composition preferably comprises a colourless polymer. The colourless polymer composition may be any suitable composition well known in the art of seed coating.

In yet another aspect, the present invention provides a comprising (a) the marker system of the invention as defined above, wherein said first and second markers are provided in one or separate containers, and (b) a detector system for detecting the presence of said markers on a product, said detector comprising an excitation source and a detector for detecting fluorescence emitted form said markers, said kit further optionally comprising (c) a carrier or diluent for carrying the markers and or applying the markers to the product and/or (d) instructions for the application of said marker system to a product, for operating said detector and for the authentication said marked product.

In yet another aspect, the present invention provides a product marking comprising the marker system of the invention as defined above.

In yet another aspect, the present invention provides a marked seed comprising an exterior surface coated with a coating composition comprising the markers system of the invention as defined above.

In yet another aspect, the present invention provides a method for the analysis of a surface treatment of a product, said surface treatment comprises the application of molecules to the outer surface of said product, wherein said method comprising the steps of:
 applying a marker system of the invention as defined above to the surface of said product as part of said surface treatment;
 quantitatively or qualitatively analysing the intensity of at least one of the markers in said marker system on the surface of said product; and
 comparing the measured intensity to a preset level in order to assess the result of said surface treatment.

In a preferred embodiment of said method, the product is a seed and wherein said surface treatment comprises the application of a desired amount or concentration of molecules to said seed.

DETAILED DESCRIPTION OF THE INVENTION

The term product, as used herein refers in principle to any type of product that can be marked with molecular markers. For instance, the product may be a fluid or solid product. Suitable solid product may be products of manufacture or natural products. Products of manufacture may for instance comprise clothings, shoes, "batch of product" or "type of product".

The term "seed" as used herein refers to both horticultural and agricultural seed. Agricultural seeds include the seed of grass, legume, forage, cereal and fiber crops. Agricultural seeds include for instance seeds from grasses or cereal crops, including corn, wheat, barley, sorghum etc.; or seeds from vegetable crops such as carrot, onion, and tomato. Horticultural seeds include such seeds of crops, especially flowers, fruit, and vegetables generally grown in gardens or greenhouses. Such crops include pepper, melon, tomato, cucumber etc.

As used herein, the term "upconversion" refers to a process where light can be emitted with photon energies higher than those of the light generating the excitation. Photoexcitation at a certain wavelength in the near infrared (NIR) followed by luminescence at a shorter wavelength in the VIS is called NIR to VIS photon upconversion. This is a rather unusual process since low energy photons are "converted" to higher energy photons. At least two NIR photons are required to generate one VIS photon. When a medium (e.g. a laser gain medium) emits fluorescence as a consequence of being excited with incident light, the wavelength of the fluorescence is usually longer than that of the exciting light. This means that the photon energy is reduced. However, under some circumstances upconversion fluorescence can occur, where the wavelength of the emitted light is shorter. This is possible via excitation mechanisms which involve more than one absorbed photon per emitted photon. One kind of mechanism is sequential absorption of pump photons by excited state absorption. A first absorption process leads to some metastable excited level, from where further absorption can take the ion to even higher levels. Such processes require high pump intensities, but not necessarily high doping concentrations. With suitable level configurations as e.g. in thulium (Tm3+) ions, a single pump laser can be used for all excitation steps, but there are cases where multiple pump wavelengths are required. Another type of mechanism involves energy transfer processes between different laser ions. Here, e.g. two laser ions in a metastable intermediate level interact to generate one ion in a higher lying state while the other one becomes deexcited (→ cooperative upconversion). High doping densities are usually required in order to enable such energy transfers. Even at lower doping densities, some host media have a tendency for clustering of the dopants, facilitating energy transfers.

Wavelength up-conversion is a known phenomenon. Any material with radiative transitions between more than two energy levels could be used, in principle, as an up-converter. Such a material would emit light at discrete wavelengths corresponding to the radiative energy level transitions.

Up-conversion comes from inducing successive absorption in a single ion. This can lead to up-conversion emission through a scheme termed Excited State Absorption (ESA) while other schemes involve two and three phonon assisted energy transfers such as in Ground State Absorption (GSA), Energy Transfer Up-conversion (ETU), and Addition of photon by Transfer of Energy (APTE). Up-conversion by sequential ground-state excitation/excited state excitation (GSA/ESA) involves a two step excitation of electrons from the valence band via an intermediate level into the conduction band by absorption of two low energy photons followed by a radiative transition of the electron from the conduction band into the valence band.

Many infrared-to-visible up-conversion materials are known to emit light at a discrete visible wavelength. Some of these materials are commonly used in laser applications, others as phosphors, to convert infrared emissions to visible laser and light emissions. Most of these materials consist of crystals or glasses that contain one or more dopants of rare earth element compounds.

Trivalent ytterbium ion ($Yb^{3+}$) has been used as a sensitizer of energy transfer for infrared to visible up-conversion laser. There are only two known energy levels for trivalent ytterbium, the $^{2F}_{7}/2$ ground state and $^{2F}_{5}/2$ excitation state. Since there are only two known energy levels for $Yb^{3+}$, it would not be expected to produce up-converted or down-converted luminescence alone. Instead, $Yb^{3+}$ has commonly been used as a sensitizer for at least one other rare earth ion. The electron transition between $^{2F}_{7}/2$ and $^{2F}_{5}/2$ occurs at about $10^4$ $cm^{-4}$ energy level or at about 1,000 nm wavelength of light. The $Yb^{3+}$ absorbs energy at about 976 nm. Under pumping of an infrared laser diode, $Yb^{3+}$ ion at ground state is excited to $^{2F}_{5}/2$ excitation state. The excited $Yb^{3+}$ transfers its energy to a nearby rare earth ion, such as a $Tm^{3+}$, $Ho^{3+}$, or $Er^{3+}$ ion, which then emits visible light through other known electron transitions.

The concept of frequency up-conversion (UC) of infrared-to-visible light in rare-earth (RE) doped materials was reported more than forty years ago for the first time. The efficiency that was observed or expected for this process was low in singly doped media, but it was quickly noticed that the mechanism could be made one or two orders of magnitude more efficient by using ytterbium (Yb) as a sensitizer ion in addition to the active ion: erbium (Er), holmium (Ho), or thulium (Tm). Efficient UC materials were extensively investigated, as they could be used for several potentially useful photonic applications, such as in UC lasers (visible lasers that are pumped by infrared diode lasers), or in display applications. However, because no powerful source existed in the 980-nm region in order to excite those up-converters, no practical product came out of the research. With the development of powerful 980-nm diode lasers lead by the telecommunication industry, a technology that appeared to be too inefficient in the past now has legitimate practical applications.

Examples of upconversion labels are sodium yttrium fluoride ($NaYF_4$) doped with lanthanide ions. Suitable lanthanide ions are the rare earths selected from lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu). Preferred lanthanide ions such as ytterbium ($Yb^{3+}$), holmium ($Ho^{3+}$), Erbium ($Er^{3+}$) or Thulium ($Tm^{3+}$), or $Yb^{3+}/Er^{3+}$ co-dopants.

Hexagonal sodium yttrium fluoride, $NaYF_4$, is the most efficient host material to date for green ($Yb^{3+}/Er^{3+}$ doped) and blue ($Yb^{3+}/Tm^{3+}$ doped) upconversion (UC) phosphors. Alternatively, blue light can be efficiently generated by Yb,Tm:YLF(yttrium lithium fluoride) when pumped with diode laser light having a wavelength of approximately 958 to approximately 959 nm, green visible light can be efficiently generated by Yb,Er:NYF(sodium yttrium fluoride) when pumped with diode laser light having a wavelength of approximately 976 nm, and red visible light can be efficiently generated by Yb,Er:KYF(potassium yttrium fluoride) or Yb,Er:YF3 when pumped with diode laser light having a wavelength of approximately 973.5 nm to approximately 976 nm (see for instance U.S. Pat. No. 6,897,999).

Photo-luminescent properties of rare earth compounds as described in detail in U.S. Pat. No. 7,184,203 may also be used in aspects of the present invention.

The UC labels are preferably used in aspects of the invention in the form of doped microparticles (1-5 μm or even 10-100 μm) or nanoparticles (10-500 nm). Methods for the manufacture thereof are well known in the art. Reference is made to e.g. WO2002/020695, and to the various compounds that can be used as labels as provide therein.

The term "luminescence" as used herein refers to the process in which light is emitted from a material at a different wavelength than that which is absorbed. It is an umbrella term covering both fluorescence and phosphorescence.

The term "fluorescence" as used herein refers to a luminescence phenomenon in which electron de-excitation occurs almost spontaneously, and in which emission from a luminescent substance ceases when the exciting source is removed. In fluorescent materials, the excited state has the same spin as the ground state. A compound capable of fluorescence is termed a "fluor".

The term "phosphorescence" as used herein refers to a quasi-stable electron excitation state involving a change of spin state (intersystem crossing) which decays only slowly. In phosphorescence, light emitted by an atom or molecule persists after the exciting source is removed. It is similar to fluorescence, but the species is excited to a metastable state from which a transition to the initial state is forbidden. Emission occurs when thermal energy raises the electron to a state from which it can de-excite. Therefore, phosphorescence is temperature-dependent. The term phosphorescence thus refers to a delayed luminescence or sustained glowing after exposure to energized particles such as electrons or ultraviolet photons, that is, a luminescence that persists after removal of the exciting source. It is sometimes called afterglow. A compound capable of phosphorescence is termed a "phosphor".

The term "UV/VIS" refers to ultraviolet-visible, which term is used herein to refer to either UV or VIS.

The terms "VIS" and "visible" when used in connection to markers refer to the fact that the markers exhibit a characteristic excitation/emission (fluorescence) spectrum when excited with light in the visible spectrum (or sometimes called the optical spectrum), which is the portion of the electromagnetic spectrum that is visible to (can be detected by) the human eye. A typical human eye will respond to wavelengths in air from about 380 to 750 nm. A VIS marker includes reference to conventional colour dyes.

The terms "UV" or "ultraviolet" refer to when used in connection to markers refer to the fact that the markers exhibit a characteristic excitation/emission (fluorescence) spectrum when excited with light in the ultraviolet spectrum, which is the portion of the electromagnetic spectrum wherein the electromagnetic radiation has a wavelength shorter than that of visible light, but longer than soft X-rays (ie. 10-400 nm).

The term "infrared" as used herein is intended to encompass the range of light spectrum above approximately 650 nm and includes both the far infrared and the near infrared. The term "near-infrared", as used herein, refers to the wavelength region between about 650 nm and 2000 nm, and preferably between about 750-1100 nm, while the term "far infrared" refers to wavelengths between 1 and 10 mm.

The infrared labels used in aspects of the present invention are preferably excited at wavelengths of about 500-1000 nm.

The near-IR (700-1100 nm) marker may for instance be a product such as ClirCode, which is available from Eastman Chemical Company. This near-IR marker can be used at extremely low concentrations, on the order of parts per million (ppm) to parts per billion (ppb). Even at such low concentrations, it is visible under a diffuse IR light source, because of its extreme sensitivity of fluorescence. Other suitable NIR labels are FHI 8162, FHI 7782, FHI 8082, FHI 8022, and FHI 7832, available from Fabricolor Holding Inc., Paterson, N.J., USA, the invisible inks marketed under the name ClirCode available from Eastman Chemical Company, Kingsport, Tenn., USA, and the IR dye 700 and 800 labels available from LI-COR Biosciences, Lincoln, Neb., USA.

The phosphorescent materials useful in aspects of the present invention include zinc sulfide and strontium aluminate or of strontium oxide aluminate, with a luminance approximately 10 times greater than zinc sulfide. Strontium aluminate based afterglow pigments are marketed under brandnames like Super-LumiNova or NoctiLumina. Other suitable phosphors are for instance described in U.S. Pat. No. 5,424,006.

The Phos marker as referred to herein is commonly referred to as a "phosphor". A phosphor is a substance that exhibits the phenomenon of phosphorescence. Phosphors are transition metal compounds or rare earth compounds of various types. The most common uses of phosphors are in Cathode ray tubes (CRT) displays and fluorescent lights. CRT phosphors were standardized and designated by the letter "P" followed by a number. Phosphors are usually made from a suitable host material, to which an activator is added. The best known type is a copper-activated zinc sulfide and the silver-activated zinc sulfide. Suitable host materials are typically oxides, nitrides and oxynitrides, sulfides, selenides, halides or silicates of zinc, cadmium, manganese, aluminum, silicon, or various rare earth metals. The activators prolong the emission time (afterglow). In turn, other materials (eg. nickel) can be used to quench the afterglow and shorten the decay part of the phosphor emission characteristics. All of the above phosphors are suitable for use in the present invention. Thus, the phosphorescent materials useful in aspects of the present invention include zinc sulfides and strontium aluminates, with a luminance approximately 10 times greater than zinc sulfide. Strontium aluminate based afterglow pigments are marketed under brandnames like Super-LumiNova or Nocti-Lumina. Other suitable phosphors are for instance described in U.S. Pat. No. 5,424,006.

Other suitable compounds include $SrAl_2O_4$:Eu,Dy or Europium/Dysprosium-activated (or doped) strontium aluminate and $Sr_2MgSi_2O_7$:$Eu2+$;$Dy3+$ or Europium/Dysprosium -doped strontium magnesium silicate. Doping may for instance also occur with Terbium ($Tb3+$). Doping may occur with any one individual or a combination of activators (co-doping). Usually, the phosphors are in particulate form (as powders) usually with a particle sixe of 1-100 μm, preferably 15-25 μm. In alternative preferred embodiments nanometer-sized particles (10-500 nm) can be used.

The commonly quoted parameters for phosphors are the wavelength of emission maximum (in nanometers, for instance 200-450 nm for strontium aluminate and zinc sulfide, or alternatively color temperature in Kelvins for white blends), the peak width (in nanometers at 50% of intensity), and decay time or afterglow extinction (in seconds or minutes). The emission wavelength for strontium aluminate and zinc sulfide is usually 520-530 nm (yellowish-green), although other colours may also be obtained, The phosphor for use in aspects of the present invention is not particularly limiting to any particular type, This Phos marker can be used at extremely low concentrations, in the order of parts per million (ppm) to parts per billion (ppb). Preferably the concentration or amount used of the Phos marker is 0.01-100 ppb (or μg/kg) or even lower.

It is possible in aspects of the present invention that the emission of the UC marker is used as an excitation wavelength for the UV/VIS and/or NIR and/or Phos marker. Alternatively each marker may be independently excited. Preferably, the emission of the UC will be used as the excitation for the NIR marker. The excitation of the UV/VIS fluorescence or Phos markers may require a separate excitation wavelength, but identical excitation wavelengths may also be used.

The present invention provides a marker system comprising an upconversion (UC) marker and a UV/VIS and/or NIR and/or Phos marker, provided separately or as a mixture, wherein the emission spectrum of the specific UC marker in combination with the emission spectrum of the specific UV/VIS and/or NIR and/or Phos marker when excited with the appropriate excitation wavelengths provides for a multi-colour coding system.

The UC and NIR/UV/VIS/Phos markers may be provided at different intensities to expand the number of unique codes in the system. Alternatively, the level of intensity of the UC and NIR/UV/VIS/Phos fluorescence may be substantially the same. It is an advantage of using different intensities that the differentiating capacity of the different intensities can be used as an additional diversifiers. The measurement of these intensities can also be used as a method to quantify the amount of certain "marked" products onto other products, for example the use of markers in a seed treatment product (such as a fungicide, an insecticide, etc) that will be applied to the seed. The intensities can be used as an estimation of the quantity of those chemicals applied to the seeds. For this purpose, at least one of the markers may be provided in combination with a surface treatment (that is, mixed with the treatment formulation) in order to quantitatively or qualitatively monitor the result of the surface treatment in terms of amount of formulation applied to the surface.

In a preferred embodiment of the invention the UC marker is selected from compounds doped with lanthanides Yb, Ho, Er or Tm, or combinations thereof. These compounds can provide for 3-4 different excitation wavelengths or coding-colours.

In a preferred embodiment of the invention the NIR marker is selected from FHI 8162, FHI 7782, FHI 8082, FHI 8022, and FHI 7832, available from Fabricolor Holding Inc., Paterson, N.J., USA, and the invisible inks marketed under the name ClirCode available from Eastman Chemical Company, Kingsport, Tenn., USA and the IR dye 700 and 800 labels available from LI-COR Biosciences, Lincoln, Neb., USA. These compounds can provide for at least 8 different excitation wavelengths or coding-colours. When any one UC markers is combined with any one NIR marker, a multi-colour code is generated that is one of a total of 24-32 possible combinations.

Thus, the present invention provides a marker system comprising an upconversion (UC) marker selected from a set of m UC markers, and a near infra red (NIR) marker selected from a set of n NIR markers, wherein the combination of said selected markers is provided as a set of separate markers or as a mixture of markers, and wherein the emission spectrum of the specific UC marker in combination with the emission spectrum of the specific NIR marker when excited with the appropriate excitation wavelengths provides for a single multi-colour marking code out of a total of m×n marking codes.

Additionally, the marker system of the present invention may be expanded by using one or more UV fluorescent dyes excited UV wavelengths and emitting light in the visible spectrum. The number of UV fluorescent dyes that can be used in combination with the basic UC/UV-VIS-NIR-Phos system of the present invention is not limitative.

The intensity of the UV fluorescent dye may be provided as a percentage of the intensity of the basic UC/UV-VIS-NIR-Phos system. For instance, when the basic UC/UV-VIS-NIR-Phos system is set at an intensity of 100%, a single LTV fluorescent dye may be provided in an authentication system of the present invention in an intensity of 20% (low), 100% (middle) or 200% (high) thereof. Preferably, the range provides for clearly distinguishable, discrete levels of LTV fluorescence, so that not only the fluorescent wavelength of the LTV fluorescent dye is a marker, but also its intensity. This greatly expands the possible number of unique authentication codes.

The UV fluorescent markers can very suitably provide for a sub-code level of the marking system. Various product treatments, such as insect resistance treatments for seeds, can thereby be marked to the product.

Also, by virtue of the quantitative nature of the sub-code system, the UV fluorescence labels may be used as a quality-control measure, for instance for assessing compliance with a certain treatment protocol.

The markers may be provided to the seed in several ways. For instance one may treat the seeds such that the marker is provided on the seeds pericarp. Alternatively the marker may be provided as (part of) a seed treatment process, including but not limited to, a seed coating, seed encrusting and/or seed pelleting.

An important advantage of the present invention is that the marking system can be used to quantify the binder, biologically active agent, for instance biocides, nutrients and soil conditioners, and miscellaneous adjuvants or excipients, in a seed coat or seed crust, i.e. to monitor the efficacy and accuracy of the seed treatment process. Any one individual marker of a marker system of the present invention may be provided in a pre-determined quantity to serve as an internal standard for monitoring the amount of other agents in the seed coat. This system may be used to monitor the amount of treatment substance successfully loaded on a set amount (e.g. per kilogram) of seed as a result of a coating process, which amount is referred to as the recovery. Alternatively, this system may be used to monitor the amount of treatment substance successfully loaded on individual seeds as a result of a coating process, which amount is referred to as the distribution. Hence, the present invention provides for a method of determining the recovery and/or distribution of seed coat substance (binder, biologically active agent, for instance biocides, nutrients and soil conditioners, and miscellaneous adjuvants or excipients, in a seed coat or seed crust) as quality parameters of a seed treatment process. The method comprises the co-application of the marker-system of the present invention with the seed coat substance, preferably as a mixture, and the determination of the amount of at least one marker of said marker system present in the resulting seed coat. Comparing the presence of the amount of the marker in the coat on the basis of individual seeds or on the basis of a set amount (weight) of seeds provides a measure of, respectively, the distribution and recovery. Preferably, the marker used for monitoring of seed coat quality is a fluor or a phosphor, most preferably a phosphor. In such aspects, the marker is provided to the seed (or generally, the product) as part of a seed- (product-) treatment process, and wherein the intensity of said marker is used to monitor the quality of the seed- (product-) treatment process.

The present invention further provides a marker composition comprising the marker system of the present invention in a suitable carrier system. The marker composition may be a liquid or solid composition. Preferably the carrier system is a liquid carrier or diluent, for instance a (colourless) polymer. Such polymers are well known in the art. Alternatively, the carrier may be a powder. In yet a further alternative, the carrier may be a combination of a liquid and a powder. The powder may for instance be an encrusting powder for providing a seed coat. Such powders are well known in the art.

Preferably the carrier is an agronomically acceptable carrier. By "agronomically acceptable carrier" is meant any substance which can be used to aid the dispersion of the active ingredient without impairing the active ingredient's effectiveness and which by itself has no significant detrimental effect on the soil, equipment, desirable plants, or the agronomic environment. A very suitable agronomically acceptable carrier is water. Other suitable carriers are solid carriers such as in the form of coating polymers or coating powdered as described in more detail hereinbelow.

Thus, the marker system of the present invention is preferably provided dissolved or suspended in a polymer matrix. Preferably said polymer is a liquid form which can be applied to the product. For instance, the product may be coated by painting, printing, submerging or otherwise applying the marker composition to a surface of the product. Seeds may for instance be coated with the marker by mixing a batch of seed (for instance an amount of 1-10 tons) with the marker composition (for instance 1 L of a liquid polymer composition comprising the markers system) and allowing for the seeds to become coated with the composition. Methods for coating seeds are well known in the art and need not be described in detail here.

Seeds are often treated to reduce yield losses during cultivation and for enhancing the agronomic and nutritional value of the produce. Such treating agents are for example fungicides, insecticides, rodenticides, nematocides, miticides or bird repellents. Furthermore, many varieties of genetically altered crops are coming to the market. Treated and/or genetically modified seeds must be marked in order to distinguish them from the untreated and unmodified seeds. The marking of seeds is particularly beneficial for farmers who then can easily distinguish the chemically treated and modified seeds for plantings from e.g. cereal grains for consumption.

A number of patents describe processes for the marking and coating of seeds by active ingredients and film forming compositions. U.S. Pat. No. 5,087,475 discloses a process for the film-coating of materials using a water- and gas-permeable, adhesive film-forming substance, which consists of spraying the film-forming substance on seed materials and drying the seed materials. U.S. Pat. No. 5,470,581 discloses a process for providing an aqueous film-coating from a combination of maltodextrin and cellulosic polymers for and agricultural seeds. The aqueous suspension can be applied by spraying. U.S. Pat. No. 5,849,320 discloses a process for coating a seed with an insecticide. U.S. Pat. Nos. 4,853,429 and 4,881,343 describe an aqueous medium containing a dye or pigment and a binder resin composed of the salt of chitosan and an organic acid for seed colouring. U.S. Pat. No. 5,746,022 discloses a seed colour coating composition containing a solvent, a binder, a colourant and other optional additives. U.S. Pat. No. 4,272,417 discloses a liquid seed coating composition containing a binding agent, an active ingredient and a colouring agent in a liquid medium including water and a polyol. U.S. Pat. No. 4,368,591 discloses seeds that are coated with an active ingredient and between 0.035 and 1.8 grams of titanium dioxide per kilogram of seed. WO 99/66784 discloses a process for coating seeds with a thin coating of a pigment that selectively allows light rays having wavelengths of about 570 to 700 nm to pass there through.

In addition to the markers, the coating composition for coating a product, preferably seeds, may contain one or more of a binder, biologically active agent, for instance biocides, nutrients and soil conditioners, and miscellaneous adjuvants or excipients, as is well known to those skilled in the art. The binder is preferably a film forming or adhesive component capable of securing the coating composition to the surface of the product, for example poly(vinyl alcohol), cellulosic polymers and derivatives, such as carboxymethylcellulose, hydroxyethylcellulose, poly(acrylic acid), polyacrylamide, poly (acrylamide/acrylic acid) copolymer, ethylene oxide/propylene oxide copolymers which are solid at 25° C., and water-soluble cellulose ether, vinyl acetate, low melting polyesters, such as poly-e-caprolactone, polymers and copolymers containing 2-propenenitrile or 2-methyl-2-propenenitrile, gelatin and lignosulfonates. Preferably, the binder is a water-soluble, film forming polymer.

The biologically active agent may be an agent selected to protect the seed from pests, fungi or birds, such as an antimicrobial agent, pesticide, fungicide or repellant. The nutrients and soil conditioning agents are selected to promote germination and/or growth, such as lime, trace elements, hormones, vitamins, fertilizer, and urea.

The miscellaneous adjuvants include wetting agents, surfactants, dispersing agents:, stabilizers, drying agents, such as aluminosilicates, opacifying agents, fillers, plasticizers and various compounds which are intended to enhance the performance of the binder such as .varies.-cellulose, lactose and ethylene glycol.

A typical composition comprises the marker system of the invention in a concentration of from 0.01 to 1000 ppm based on the weight of the composition, in particular from 0.1 to 100 ppm. The skilled person will understand that the exact amount of the marker system in the composition will depend on the quality of the coating composition if not ready-mixed, the general quality of the coating obtained by the end user, the shielding of the markers by other substances in the coating, the type of coating (crust or thin-film), the matrix or carrier used, the loading level of the coating (thickness or amount applied to product), etc.

In addition, the skilled person will understand that the contribution of each of the individual markers in the marker system will be determined by the level of information required or aimed to be contained in the coding system as well as by the requirement to provide a unique authentication code.

Preferably, in order to be as cost-effective as possible, a marker composition comprises the markers in very low dosages, as the active compounds are the most costly of the composition. Generally an amount of the upconversion marker of about 5 to 10 ppm is sufficient to provide for a detectable amount of the marker on the product, when 1 L of the marker composition is mixed with 10 tons of seed. The concentration of active ingredient in a deliverable or ready for use formulation may vary in a wide range and may be as low 0.0000001 wt. % and as high as 99 wt %.

Information provided by the marking system may include (coding) reference to such information as production years (different codes for different years), different lines of hybrids, male/female distinction, geographical area, chemical treatments of the seed (e.g. antimicrobial agent, pesticide, fungicide or repellent, nutrients and soil conditioning agents, such as lime, trace elements, hormones, vitamins, fertilizer, and urea). It is a particular advantage of the present marking system that the quantitative nature allows for the evaluation of the quality of the said treatment, that is, whether the chemical has been provided to the seed in a sufficient quantity.

The product marking system of the invention may for instance be used as a packaging marker, as a marker for marking batches of seed, or for marking individual seed.

The invention claimed is:

1. A method to label a product for authentication, comprising providing said product with at least two markers,
   wherein a first of said at least two markers is an upconversion (UC) marker selected from a set of m UC markers each having a different emission spectrum, wherein m is an integer equal or greater than 3, and
   wherein a second of said at least two markers is selected from ultraviolet (UV) markers, visible (VIS) markers, near infrared (NIR) markers, phosphorescent (Phos) markers and combinations thereof (UV-VIS-NIR-Phos markers), wherein said second marker is selected from a set of n markers each having a different emission spectrum, wherein n is an integer equal or greater than 5,
   wherein the combination of said at least two markers is provided separately or as a mixture to said product, and
   wherein the emission spectrum of the first marker in combination with the emission spectrum of the second marker, when each is excited with the appropriate excitation wavelength, provides for a single multi-colour marking code for said product out of a total of m×n possible multi-colour marking codes for said product, thereby uniquely labeling said product.

2. Method according to claim 1, wherein said second marker of said at least two markers is a near infrared (NIR) marker.

3. Method according to claim 2, wherein said method further comprises providing said product with at least one additional marker which is a UV-VIS marker, wherein the emission wavelength at which the UV-VIS marker is detected is different from the emission wavelength at which the UC and/or NIR markers are detected.

4. Method according to claim 3, wherein said at least one UV-VIS marker comprises at least three UV fluorescent compounds each emitting light at a different wavelength.

5. Method according to claim 2, wherein said method further comprises providing said product with at least one additional marker which is a phosphorescent marker, wherein the emission wavelength at which the phosphorescent marker is detected is different from the emission wavelength at which the UC and/or NIR markers and/or UV-VIS markers are detected and where the detection of the phosphorescent marker can be measured in the absence of excitation irradiation.

6. Method according to claim 1, wherein at least one marker of said at least two markers is provided separately to said product as part of a product-treatment process, and wherein the intensity of said at last one marker is used to monitor the product-treatment process.

7. Method according to claim 1, wherein the product is a seed or seed coating.

8. Method according to claim 1, wherein said upconversion (UC) marker is selected from the group consisting of the markers 50020, F0027, Y0037, A0007, Z0011, and K0080 available from BrandWatch™ Global Technologies, Seattle, WA, USA, and the markers PTIR475, PTIR545, PTIR550, and PTIR660, available from Phosphor Technology Ltd, Stevenage, Herts, U.K.

9. Method according to claim 1, wherein said near infrared (NIR) marker is selected from the group consisting of FHI 8162, FHI 7782, FHI 8082, FHI 8022, and FHI 7832, available from Fabricolor Holding Inc., Paterson, NJ, USA, and the invisible inks marketed under the name ClirCode available from Eastman Chemical Company, Kingsport, TN, USA and the IR dye 700 and 800 labels available from LI-COR Biosciences, Lincoln, NE, USA.

10. Method according to claim 1, wherein said ultraviolet (UV) marker is selected from the group consisting of fluoresceins, rhodamines (FAM, R6G, TAMRA, and ROX), Texas red, BODIPY, coumarins, cyanine dyes (thiazole orange [TO], oxazole yellow, [YO], TOTO, YOYO; Cy3, Cy5), and Alexa dyes.

11. Method according to claim 1, wherein said phosphorescent (Phos) marker is selected from the group consisting of europium-, dysprosium-, and/or terbium-doped lutetium orthophosphate ($LuPO_4$:Eu/Dy/Tb); europium-, dysprosium-, and/or terbium-doped strontium aluminate ($SrAl_2O_4$: Eu/Dy/Tb); europium-, dysprosium-, and/or terbium-doped strontium magnesium silicate ($Sr_2MgSi_2O_7$:Eu/Dy/Tb), copper-activated zinc sulphide (ZnS:Cu); silver-activated zinc sulfide (ZnS:Ag); copper-activated zinc-cadmium sulphide ((Zn,Cd)S:Cu) and bismuth-activated calcium-strontium sulfide ((Ca,Sr)S:Bi).

12. Marker system for product authentication comprising a combination of at least two markers,
wherein a first of said at least two markers is an upconversion (UC) marker selected from a set of m UC markers each having a different emission spectrum, wherein m is an integer equal or greater than 3, and
wherein a second of said at least two markers is selected from ultraviolet (UV) markers, visible (VIS) markers, near infrared (NIR) markers, phosphorescent (Phos) markers and combinations thereof (UV-VIS-NIR-Phos markers), wherein said second marker is selected from a set of n markers each having a different emission spectrum, wherein n is an integer equal or greater than 5,
and wherein the combination of the emission spectrum of the first marker and the emission spectrum of the second marker, as produced when each marker is excited with radiation of the appropriate wavelength, provides for a single multi-colour marking code combination out of a total of m×n possible multi-colour marking code combinations, and wherein said first and second markers are provided separately or as a mixture in the form of a composition for application of said markers to a product.

13. Marker system according to claim 12, wherein said second marker of said at least two markers is a near infrared (NIR) marker.

14. Marker system according to claim 12, wherein said second marker is a UV-VIS marker and wherein the emission wavelength at which said UV-VIS marker is detected is different from the emission wavelength at which the UC marker is detected.

15. Marker system according to claim 12, wherein said second marker is a phosphorescent marker, wherein the emission wavelength at which the phosphorescent marker is detected is different from the emission wavelength at which the UC and/or NIR markers are detected and where the detection of the phosphorescent marker can be measured in the absence of excitation irradiation.

16. Marker system according to claim 12, wherein said system further comprises at least one UV-VIS marker, wherein the emission wavelength at which the UV-VIS marker is detected is different from the emission wavelength at which the UC and/or NIR markers are detected.

17. Marker system according to claim 12, wherein said UV-VIS marker comprises at least three UV fluorescence markers each emitting light at a different wavelength.

18. Marker system according to claim 12, wherein said system further comprises at least one phosphorescent marker, wherein the emission wavelength at which the phosphorescent marker is detected is different from the emission wavelength at which the UC and/or NIR markers and/or UV-VIS markers are detected and where the detection of the phosphorescent marker can be measured in the absence of excitation irradiation.

19. Marker system according to claim 12, wherein the composition is a coating composition and wherein said product is a seed.

20. Marker system according to claim 12, wherein said markers are provided in a colourless polymer, or in a seed coat composition.

21. Marker system according to claim 12, wherein said upconversion (UC) marker is selected from the group consisting of the markers 50020, F0027, Y0037, A0007, Z0011, and K0080 available from BrandWatch™ Global Technologies, Seattle, WA, USA, and the markers PTIR475, PTIR545, PTIR550, and PTIR660, available from Phosphor Technology Ltd, Stevenage, Herts, U.K.

22. Marker system according to claim 12, wherein said near infrared (NIR) marker is selected from the group consisting of FHI 8162, FHI 7782, FHI 8082, FHI 8022, and FHI 7832, available from Fabricolor Holding Inc., Paterson, NJ, USA, and the invisible inks marketed under the name ClirCode available from Eastman Chemical Company, Kingsport, TN, USA and the IR dye 700 and 800 labels available from LI-COR Biosciences, Lincoln, NE, USA.

23. Marker system according to claim 12, wherein said ultraviolet (UV) marker is selected from the group consisting of fluoresceins, rhodamines (FAM, R6G, TAMRA, and ROX), Texas red, BODIPY, coumarins, cyanine dyes (thiazole orange[TO], oxazole yellow [YO], TOTO, YOYO; Cy3, Cy5), and Alexa dyes.

24. Marker system according to claim 12, wherein said phosphorescent (Phos) marker is selected from the group consisting of europium-, dysprosium-, and/or terbium-doped lutetium orthophosphate ($LuPO_4$:Eu/Dy/Tb); europium-, dysprosium-, and/or terbium-doped strontium aluminate ($SrAl_2O_4$: Eu/Dy/Tb); europium-, dysprosium-, and/or terbium-doped strontium magnesium silicate ($Sr_2MgSi_2O_7$:Eu/Dy/Tb), copper-activated zinc sulphide (ZnS:Cu); silver-activated zinc sulfide (ZnS:Ag); copper-activated zinc-cadmium sulphide ((Zn,Cd)S:Cu) and bismuth-activated calcium-strontium sulfide ((Ca,Sr)S:Bi).

25. Kit of parts, comprising (a) the marker system as defined in claim 12, wherein said first and second markers are provided in one or separate containers, and (b) a detector system for detecting the presence of said markers on a product, said detector comprising an excitation source and a detector for detecting fluorescence or phosphorescence emitted from said markers, said kit further optionally comprising (c) a carrier or diluent for carrying the markers and/or applying the markers to the product and/or (d) instructions for the application of said marker system to a product, for operating said detector and for the authentication of said marked product.

26. A product comprising the marker system according to claim 12.

27. A marked seed comprising an exterior surface coated with a coating composition comprising the markers system as defined in claim 12.

28. A product prepared by the method of claim 1.

29. The product of claim 28 which is a seed.

30. A method to authenticate the product of claim 28, which method comprises subjecting said product to an excitation source and detecting fluorescence or phosphorescence emitted from said product.

31. A method for the analysis of a surface treatment of a product, wherein said surface treatment comprises the application of a treatment substance to the outer surface of said product, said method comprising the steps of:

applying a marker system according to claim 12 to the surface of said product as an internal standard to the treatment substance;

quantitatively or qualitatively measuring the intensity of at least one of the markers in said marker system on the surface of said product; and determining from the measured intensity of the marker the amount of treatment substance on said product surface in order to assess the quality of said surface treatment.

32. Method according to claim 31, wherein said product is a seed and wherein said surface treatment comprises the application of a desired amount or concentration of a seed coat to said seed.

* * * * *